US012769627B2

(12) United States Patent
Kaundinya et al.

(10) Patent No.: US 12,769,627 B2
(45) Date of Patent: Oct. 20, 2026

(54) METHOD FOR SEAMLESS FAILBACK AFTER PLANNED FAILOVER

(71) Applicant: International Business Machines Corporation, ARmonk, NY (US)

(72) Inventors: Sanjana Kaundinya, Cupertino, CA (US); Rajini Sivaram, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/912,298

(22) Filed: Oct. 10, 2024

(65) Prior Publication Data

US 2026/0104971 A1 Apr. 16, 2026

(51) Int. Cl.
*G06F 11/20* (2006.01)

(52) U.S. Cl.
CPC ...... *G06F 11/2023* (2013.01); *G06F 11/2056* (2013.01)

(58) Field of Classification Search
CPC ................. G06F 11/202-2056; G06F 11/2069
See application file for complete search history.

(56) References Cited

PUBLICATIONS

Veer et al., "An Adaptive Storage Switching Algorithm for Fault-Tolerant Network Attached Storage systems," 2024 2nd International Conference on Computer, Communication and Control (IC4), Indore, India, 2024, pp. 1-7 (Year: 2024).*

* cited by examiner

*Primary Examiner* — Michael Maskulinski
(74) *Attorney, Agent, or Firm* — CANTOR COLBURN LLP; Monchai Chuaychoo

(57) ABSTRACT

Systems and methods are directed to seamless failback after a planned failover. The method comprises executing a reverse-and-swap command to transition a primary topic on a primary cluster from a mirror state to a production state and a corresponding secondary topic on a secondary cluster from the production state to the mirror state. Based on the reverse-and-swap command, the primary topic and the secondary topic are placed in a read-only state allow the primary topic to synchronize all data. When the primary topic is in a stopped state after synchronizing all the data, the primary topic is transitioned to the production state. Subsequently, the corresponding secondary topic is transitioned to the mirror state and starts mirroring data from the primary topic.

20 Claims, 11 Drawing Sheets

METHOD FOR SEAMLESS FAILBACK AFTER PLANNED FAILOVER

TECHNICAL FIELD

The subject matter disclosed herein generally relates to data storage technologies. Specifically, the present disclosure addresses systems and methods for seamless failback after a planned failover.

BACKGROUND

Conventionally, a disaster recovery solution needs to give users a way to easily failover to a destination and be confident that when they restart their clients on the destination, it will start right where it left off on a source. Users, especially in highly regulated industries, have to be able to do both unplanned and planned failovers. A planned failover is a failover where the user explicitly transitions client applications from a primary cluster to a secondary cluster. Once the need for the planned failover is over, users have to have a way to failback to their original primary cluster and back to their original configuration. Traditionally, this results in large operational overhead due to the fact that mirror topics and cluster links have to be deleted and recreated twice-once to copy the data back to the primary cluster, and once more to re-copy the data to the secondary cluster.

BRIEF DESCRIPTION OF THE DRAWINGS

Some embodiments are illustrated by way of example and not limitation in the figures of the accompanying drawings.

DETAILED DESCRIPTION

Figure 1:
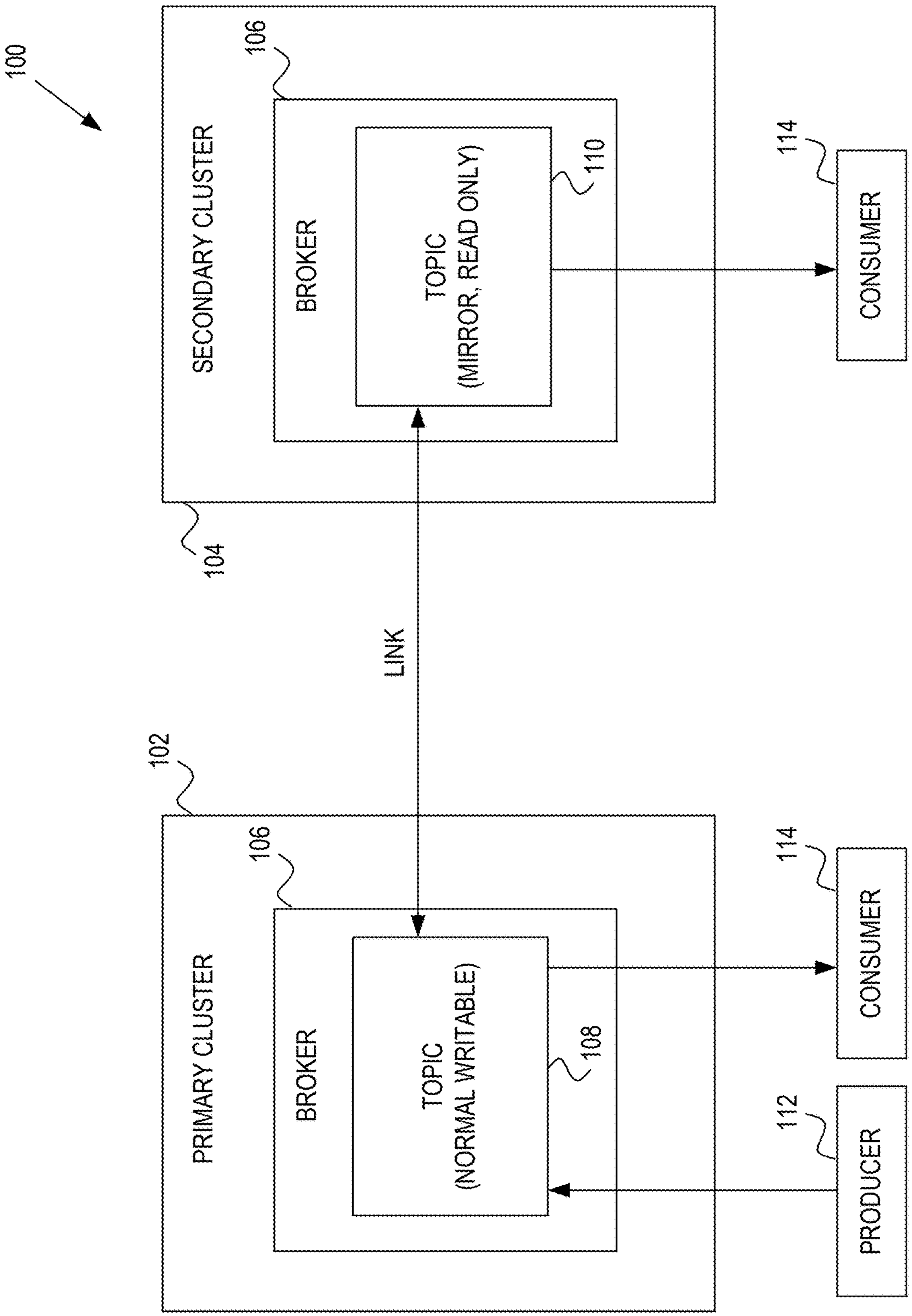
FIG. 1 is a diagram illustrating a high-level distributed streaming architecture in which planned failover and failback can occur, in accordance with example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a failback process to a primary cluster after a planned failover using a sequence of operations that preserves offsets and results in no data loss. The offsets track a sequential order in which messages are received by topics in a production cluster and allow processing to continue from where it last left off if a streaming application is turned off or if there is an unexpected failure. Thus, preserving the offsets allows for data continuity to be retained even when the application shuts down or fails. It is also critical that both failover and failback result in no data loss and minimal disruption including minimizing an amount of time events cannot be produced or consumed. Clients (e.g., producers or consumers) running on either the primary or secondary clusters cannot cause corruption or divergence in the topics.

Example embodiments utilize two new commands that trigger a sequence of operations to support efficient failback after the planned failover that are collectively referred to as reverse-and-swap commands. The first reverse-and-swap command is a reverse-and-start-mirror command that swaps mirror and production topics and activates mirroring after the swap. The second reverse-and-swap command is a reverse-and-pause-mirror command that swaps the mirror and production topics and pauses mirroring after the swap until a resume-mirror command is executed.

Thus, example embodiments address the technical problem of how to efficiently failback after a planned failover. To address the technical problem, example embodiments provide a technical solution that utilizes reverse-and-swap commands to trigger a sequence of operations to be performed on both the mirror and production clusters. The sequence of operations include placing the topics of both clusters in a read-only state and synchronizing the data in the topics of both clusters such that there is zero lag. Once zero lag is reached, a swap or reversal operation is performed in which the mirror and production topics of the clusters are swap. Thus, one or more topics of the secondary cluster (e.g., production cluster) that are written to during the failover are reversed to a mirror state, and one or more topics in the primary cluster (e.g., mirror cluster) that are mirroring during the failover are reversed to a production state. The topics on the secondary cluster can then be either immediately activated to start mirroring from the primary cluster or be place in a paused state until activated to mirror.

Advantageously, by using the technical solution, example embodiments preserve offsets and prevents data loss by, in part, synchronizing the topics in the primary and secondary clusters before a reversal/swap operation. As a result, computation overhead is reduced since there is no need to delete and recreate mirror topics and cluster links. These advantages will become apparent in the detailed description below.

FIG. 1 is a diagram illustrating a high-level distributed streaming architecture 100 in which planned failover and failback can occur, in accordance with example embodiments. The distributed streaming architecture 100 provides a distributed streaming platform used to stream processes, applications, and data. The embodiment of FIG. 1 illustrates the distributed streaming architecture 100 operating under normal conditions before a planned failover.

In example embodiments, the distributed streaming architecture 100 comprises a primary cluster 102 and a secondary cluster 104. In one embodiment, the primary cluster 102 can be on-premises of a user (e.g., customer), while the secondary cluster 104 is located in the cloud. In alternative embodiments, both the primary cluster 102 and the secondary cluster 104 are on the cloud, both the primary cluster 102 and the secondary cluster 104 are on-premise, or the primary cluster 102 is on the cloud and the secondary cluster 104 is on-premise. The primary cluster 102 and the secondary cluster 104 are communicatively coupled via one or more networks or link(s). The networks can include, for example, a wide area network (WAN), the Internet, or another packet-switched data network.

In example embodiments, the primary cluster 102 and the secondary cluster 104 both comprise one or more brokers 106. In some cases, the brokers 106 are a network of machines (e.g., servers). In other cases, the brokers 106 are containers running on virtualized servers on processors in a datacenter or a combination of the machines and containers.

The brokers 106 are configured to run a broker process in order to handle requests from clients and keep data replicated/mirrored. Specifically, each broker 106 can host a plurality of partitions associated with topics (e.g., primary topic 108 and secondary topic 110), handle incoming requests to write new events to those partitions in the topics, read events from the partitions, and/or handle replication of partitions. Each topic 108 and 110 is a unit of organization that groups similar records/data together (e.g., by category). Thus, the topics 108 and 110 act as a container to hold similar events. The partition is the smallest storage unit holding a subset of records or data for a particular topic 108 and 110. Any number of topics can be located within each broker 106 and 108.

Each broker 106 has a network server that accepts connections on one or more listeners and allocates each connection to a processor from its pool of processors. A selector associated with the assigned processor handles all traffic on the connection using non-blocking input/output. The state of each connection is stored in a channel managed by the selector.

The clients (e.g., producer 112, consumer 114) connect to the brokers 106 on one of the advertised listeners. The clients are configured with security configurations to authenticate with the broker 106 for the security protocol used by the listener. A network client used by the client has its own selector that establishes connections and processes traffic to/from the brokers 106. A state of each connection is stored in a channel managed by the selector of the network client.

For a typical flow (e.g., to obtain metadata), the client establishes a connection to the broker 106 and initiates authentication flow. If authentication fails, the connection is terminated by the broker 106. Otherwise, the channel moves to a ready state and the broker 106 starts processing requests arriving on the channel. On each channel, the client sends requests and the broker 106 processes a request, sends a response to the request, and then reads the next request.

The producer 112 is configured to produce new data and send the new data (e.g., new records) to the broker 106 in the primary cluster 102, which is the production cluster in normal operations. In some embodiments, the producer 112 comprises a client application that is a source (e.g., publishes, streams) of the events. In some embodiments, the producer 112 streams or publishes the new data to the broker 106 in the primary cluster 102 in real-time.

The consumer 114 is configured to consume data (e.g., batches of records) from one or more topics 108 or 110 of the brokers 106. More particularly, the consumer 114 is an end-user or application that retrieves data from the primary cluster 102 or the secondary cluster 104. In some embodiments, the consumer 114 subscribes to respective topics 108 or 110 in order to read and process data from the respective topics 108 or 110.

Thus, the primary cluster 102 receives the new data from the producer 112 and stores the new data in its respective topics 108. Because of the desire to have data accessible from both the primary cluster 102 and the secondary cluster 104, the new data is replicated (e.g., mirrored) by the secondary cluster 104 from the primary cluster 102. In example embodiments, this is done by the secondary cluster 104 reaching out to the primary cluster 102 over the link (e.g., network) and mirroring the data into corresponding topic 110 at the secondary cluster 104. Thus, the secondary cluster 104 is a mirror cluster in FIG. 1.

In example embodiments, any of the components shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 11, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of brokers 106 may be embodied within the primary cluster 102 and/or the secondary cluster 104. While only a single primary topic 108 and a single secondary topic 110 are shown, example embodiments can comprise any number of primary topics 108 in the primary cluster 102 and any number of secondary topics 110 in the secondary cluster 104.

During a planned failover, a customer or user will need to swap the production and mirror clusters. In order to prevent data loss, the user waits until mirror lag in the secondary cluster is close to zero. Once this condition is reach, application(s) in the primary cluster 102 are shut down and a reverse command is then executed. In example implementations, the reverse command comprises a reverse-and-swap command. The reverse-and-swap command is similar to a promote command in that the secondary cluster 110 is expected to be online and metadata related to the mirror topics is being synchronized. However, the reverse-and-swap command does this by fencing off a remote topic (e.g., the secondary topic 110) to ensure there is zero (or near zero) lag. As discussed, the reverse-and-swap command should only be issued when the lag is at or close to zero. This is because if the lag is quite high, both the primary clusters 108 and the secondary cluster 110 can end up in a read only state for a long time, which is not ideal. The reverse-and-swap command can be a reverse-and-start mirror command or a reverse-and-pause-mirror command. The different reverse-and-swap commands will be discussed in further detail below in connection with the failback process.

When the mirror topic (e.g., the secondary topic 110) moves to a stopped state, an application can then be started on the secondary cluster 104. If anything goes wrong prior to the application start on the secondary cluster 104, the primary cluster 102 can be restored using failover and applications started on the primary cluster 102. This ensures no data loss.

Figure 2:
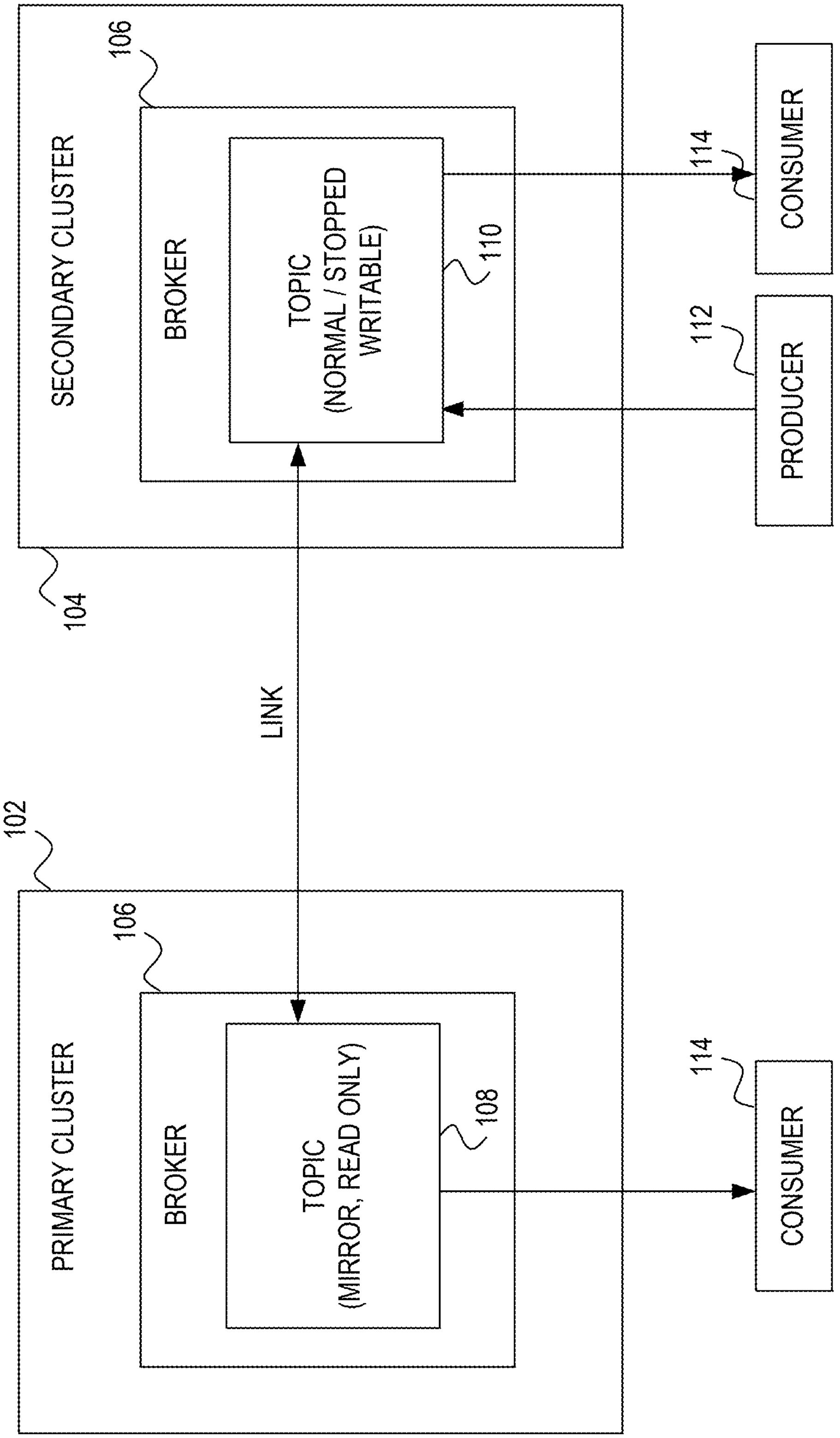
FIG. 2 illustrates the distributed streaming architecture in the planned failover stage, in accordance with example embodiments.

Thus, in response to execution of the reverse command, the primary topic 108 on the primary cluster 102 now copies or mirrors the data from the secondary cluster 104 and the secondary topic 110 on the secondary cluster 104 is now being written to by the producer 110. As such, the data flow via the link is essentially reversed. FIG. 2 illustrates the distributed streaming architecture 100 in the planned failover state, in accordance with example embodiments. As shown in FIG. 2, the secondary topic 110 in the secondary cluster 104 is now being written to by the producer 112. The secondary topic 110 can also provide data to the consumer 112. Because the data is now being written to the secondary topic 110, the primary topic 108 in the primary cluster 102 mirrors the data from the secondary topic 110 and can only be read from by the consumer 114.

Figure 3:
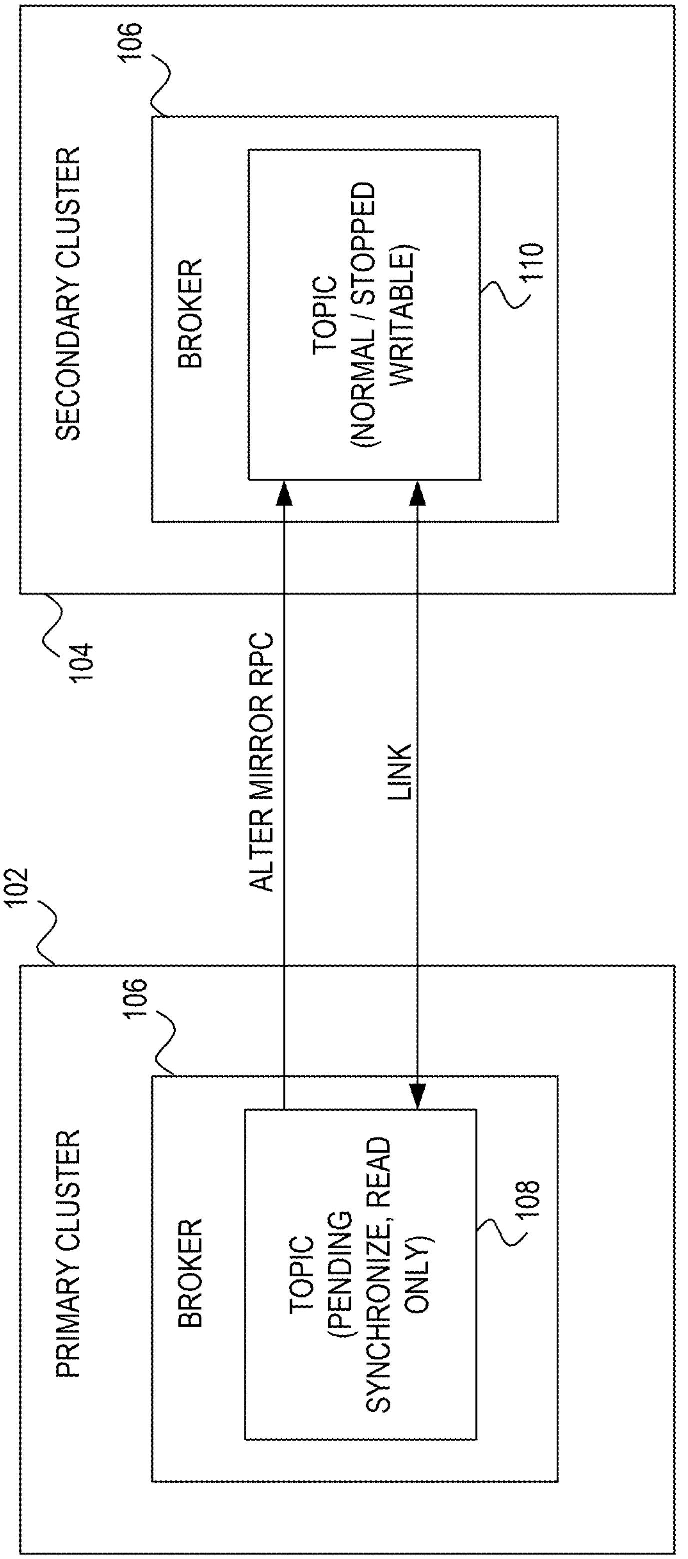
FIG. 3 is a diagram of a first stage of the failback process, according to some example embodiments.

In order to initiate the failback process, the producers 112 first need to be stopped at the secondary cluster 104. Once the producers 112 are stopped, the reverse-and-swap command can be issued when lag is detected to be close to zero. FIG. 3 is a diagram of a first stage of the failback process, according to some example embodiments. Once the reverse-and-swap command is issued, the primary topic 108 transitions to a PendingSynchronizeMirror state. The PendingSynchronizeMirror state is a state where data is actively fetched from the secondary topic 110 and metadata for the topics 108 and 110 is synchronized.

Figure 4:
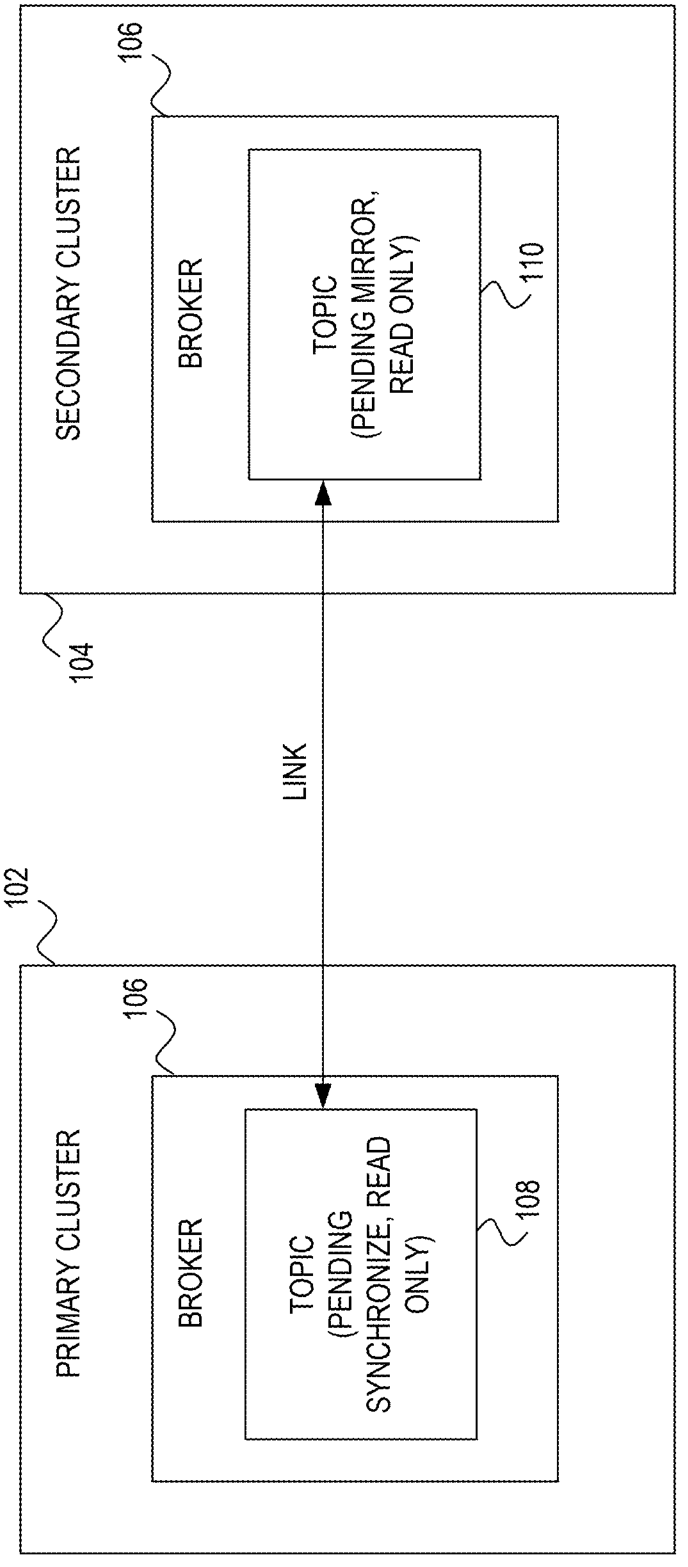
FIG. 4 is a diagram of a second stage of the failback process, according to example embodiments.

Once the state of the primary topic 108 is changed from a Mirror state to the PendingSynchronizeMirror state, an AlterMirror remote procedure call (RPC) is issued to the secondary cluster 104 to place the secondary topic 110 in an immutable PendingMirror state. As such, both the primary topic 108 and the secondary topic 110 are now in a read-only state. Thus, no extra writes to the topics 108 or 110 can occur in order to prevent any data loss or divergences during the failback process. FIG. 4 is a diagram of this second stage of the failback process, according to example embodiments.

The PendingMirror state is a read-only state that fences off any producers 112. This ensures that progress is made on any lag (if it still exists) in the primary topic 108 (e.g., finish up backfilling records until lag is zero). At this stage, there is a periodical check for the lag to go to zero before a next action of stopping the primary topic 108 and making it a writable topic. This stage should not take long as the user and/or components have verified that the lag was zero or near zero before issuing/executing the reverse-and-swap command. With zero lag, all of the data in the primary topic 108 is also in the secondary topic 110 and vice-versa. Thus, there is no divergence.

Once the lag has reached zero, an AlterMirror RPC is issued on the primary cluster 102 that is equivalent to a promote command, but with a timeout for consumer offset synchronization. Because the process cannot wait for consumer offset synchronization indefinitely when neither cluster 102 and 104 is in a writable state, the timeout is included in the process. Thus, a configurable timeout called mirror-.topic.metadata.sync.timeout.ms, for example, is added that defaults to a predetermine amount of time. In one example, the predetermined amount of time is 60 seconds. In some embodiments, the predetermined amount of time is configurable by the user. As such, the timeout will be what is used to wait for the promote command to complete.

Figure 5:
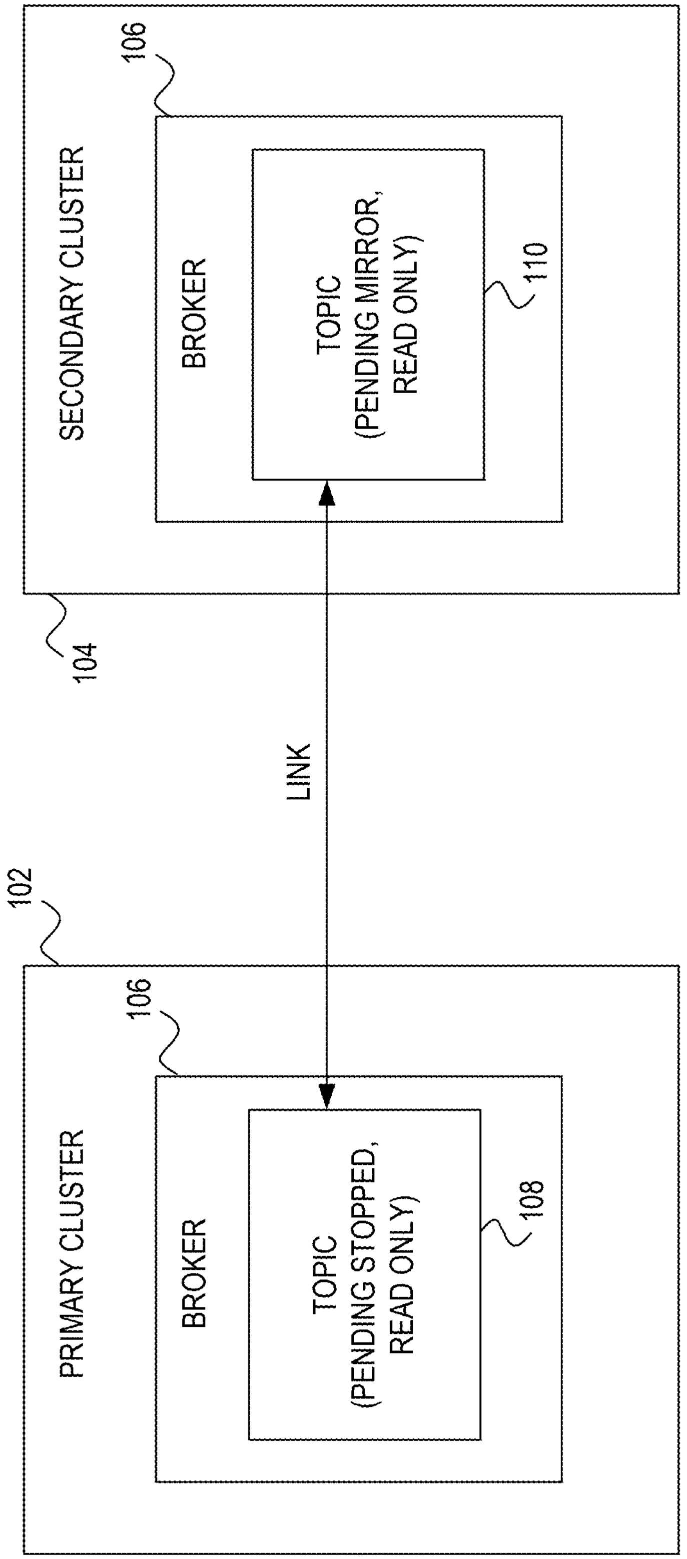
FIG. 5 is a diagram of a stage of the failback process in which the clusters wait for a promote command to complete, according to example embodiments.

FIG. 5 is a diagram of a stage of the failback process that waits for the promote command to complete. During this stage, a best effort synchronization of consumer offset (e.g., best effort attempt at mirror topic metadata synchronization) is performed. As shown, the primary topic 108 is in a PendingStoppedMirror state. If the primary topic 108 does not transition to a StoppedMirror state within mirror.topic-.metadata.sync.timeout.ms using the promote command, a follow up AlterMirror RPC can be issued. This follow up AlterMirror RPC is the equivalent to a failover command to quickly transition the primary topic 108 to a StoppedMirror topic in order to transition the primary topic 108 into a writable state.

Figure 6:
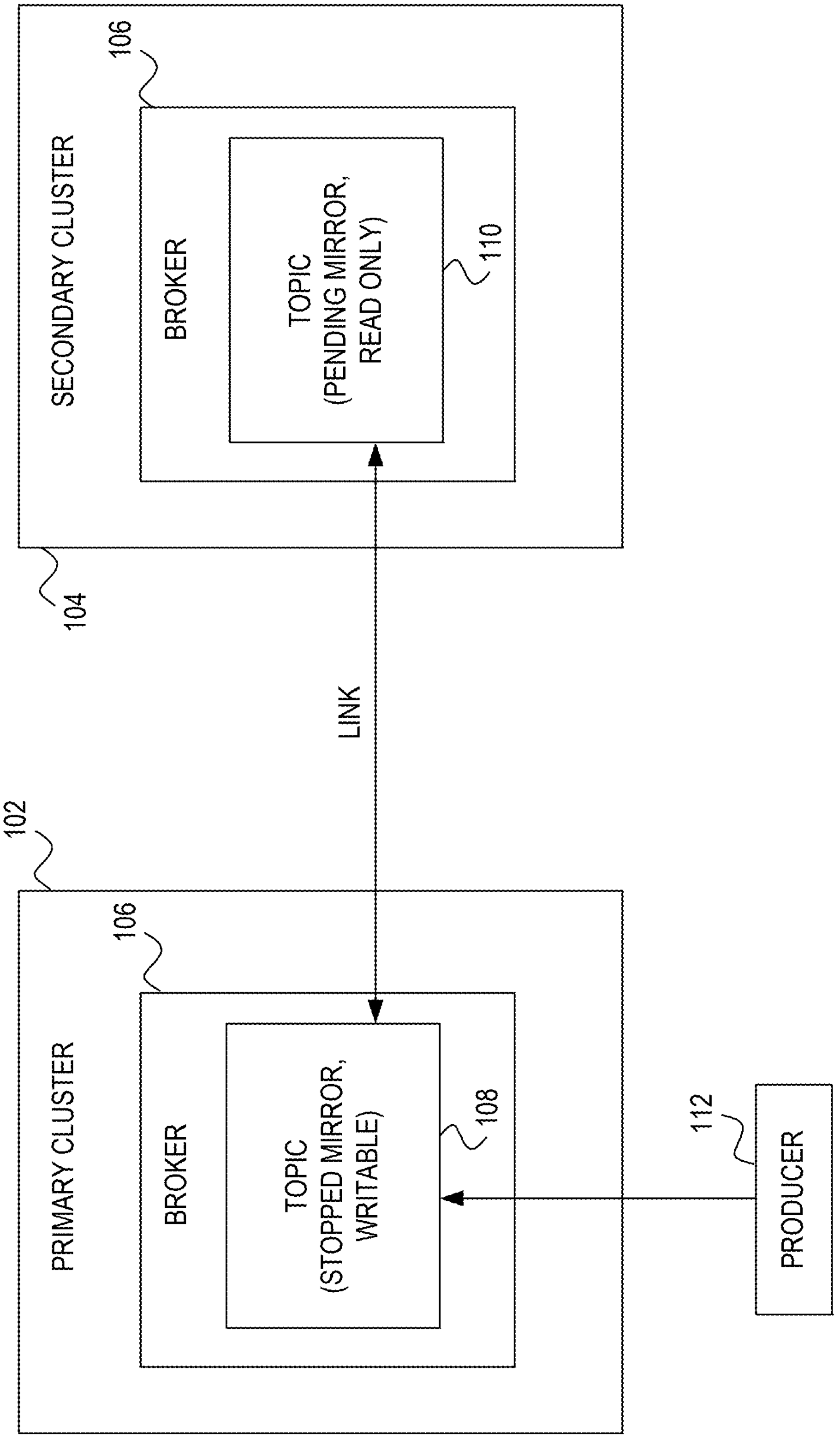
FIG. 6 is a diagram of a stage of the failback process in which production is restarted on the primary cluster, according to example embodiments.

FIG. 6 is a diagram of a stage of the failback process in which production is restarted on the primary cluster 102. Once the primary topic 108 mirroring is stopped (e.g., StoppedMirror state), a stopped log end offset is recorded in the primary topic 108. At this point, an application (e.g., the producer 112) can be started up on the primary cluster 102 for the first topic 108.

Now that the production topic has effectively been swapped back to the primary cluster 102, the mirror topic (e.g., secondary topic 110) on the secondary cluster 104 needs to be activated. This can be achieved using one of two new commands: reverse-and-start-mirror command and reverse-and-pause-mirror command. With the reverse-and-start-mirror command, the secondary cluster 104 will have its mirror (secondary) topic 110 activated. With the reverse-and-pause-mirror command, the secondary topic 110 on the secondary cluster 104 will be in a PausedMirror state, and the user will have to (when they are ready to activate the mirroring) issue a resume-mirror command on the secondary topic 110.

With respect to the reverse-and-start-mirror command, the secondary cluster 104 watches for a state change on the primary topic 108 on the primary cluster 102 and changes states internally after seeing the primary cluster 102 go into a StoppedMirror state. When the secondary cluster 104 detects the state change, the secondary cluster 104 converts itself to a Mirror state. As an alternative embodiment, once the process to stop the mirror on the primary cluster 102 has completed, the primary cluster 102 can send an AlterMirror RPC to the secondary cluster 104 to start the mirror topic (e.g., the secondary topic 110). The AlterMirror RPC will work when the secondary topic 110 is in a PendingMirror state and will fail on the secondary topic 110 in any other state.

Once the request is received on the secondary cluster 104, verifications are performed before the secondary topic 110 is converted into a Mirror state. The verification includes determining whether there exists a topic on a remote cluster (e.g., the primary cluster 102) with the same topic ID as the persisted remote topic ID and whether the remote topic (e.g., the primary topic 108) is in a StoppedMirror state with the same stopped log end offsets as the log end offsets at the local topic (e.g., the secondary topic 110). If either of these checks fails, then the mirror topic is failed. This is because either (1) the remote topic has been deleted or recreated, or (2) there was production on the local topic before it went into a PendingMirror state resulting in the logs having diverged. As a result, the local or secondary topic 110 cannot be safely converted to a mirror topic. In either of these cases, the state will transition to a FailedMirror state. A failover command will then need to be issued on the remote or primary topic 108 to make it writable again.

Figure 7:
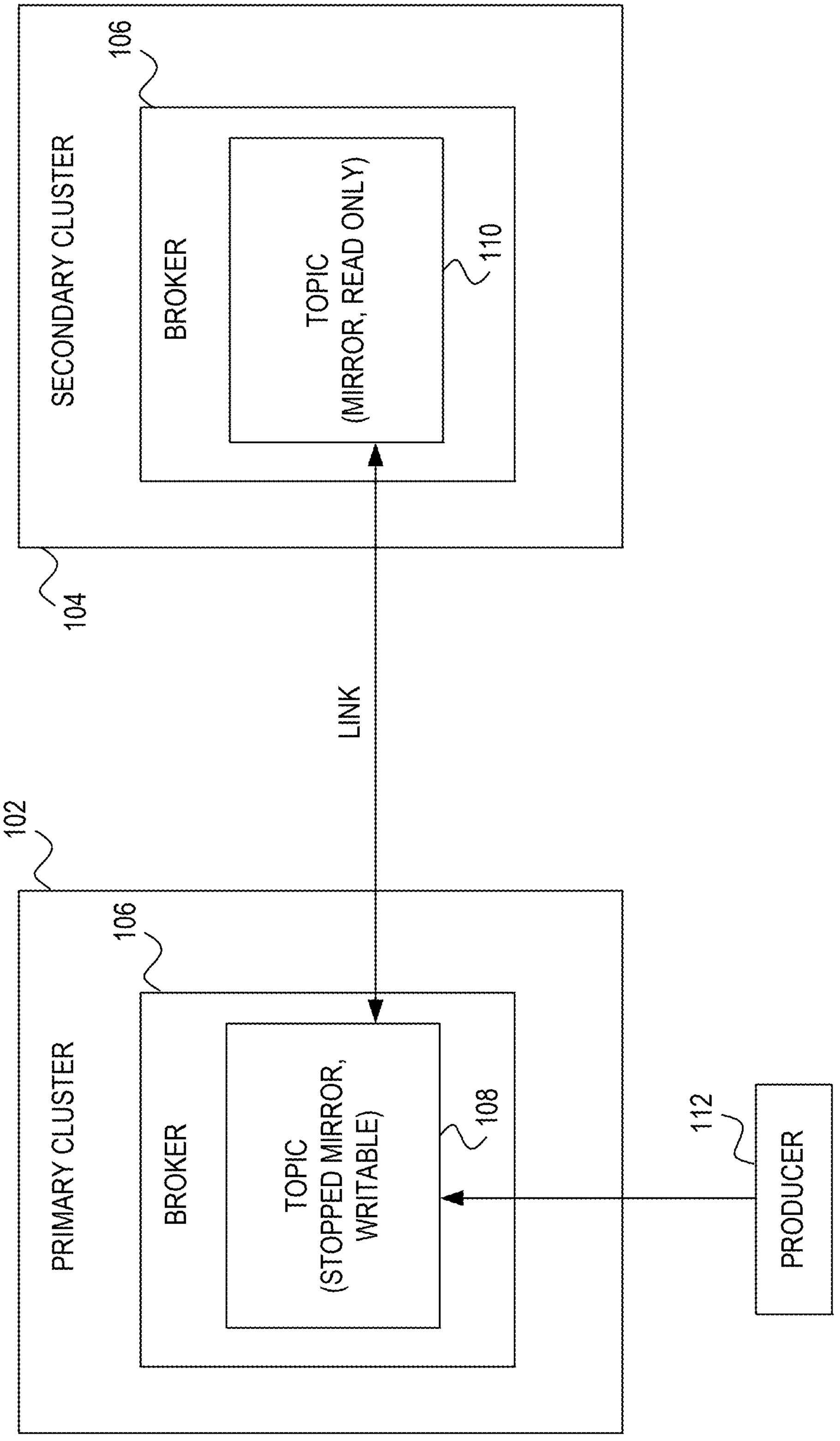
FIG. 7 is a diagram of a stage of the failback process in which the secondary topic is transitioned into a mirror topic after failback, according to example embodiments.

Once it is verified that the secondary topic 110 can transition from a PendingMirror state to a Mirror state, the activation of the secondary topic 110 to a Mirror state is performed. FIG. 7 is a diagram of this stage of the failback process in which the secondary topic 110 is transitioned into a mirror topic after failback.

It is noted that all the steps relative to activating mirrors using the reverse-and-swap command (e.g., the reverse-and-start-mirror command) are expected to complete in the lifecycle of the request. This means that if the verification check fails at any point, the mirror topic is failed and the secondary topic 110 set to FailedMirror state. An error is then returned if this happens. For reverse-and-start-mirror, a background task running the task for that command will complete once the RPC for activating mirrors completes, whether successful or not (e.g., in error).

Referring back to FIG. 6, with respect to the reverse-and-pause-mirror command, once the mirror on the primary cluster 102 has completed, the primary cluster 102 transmits an AlterMirror RPC to the secondary cluster 106 to pause the mirror (secondary) topic 110.

Once the request is received on the secondary cluster 104, verifications are performed before converting the secondary topic 110 into a PausedMirror state. The verification determines whether there exists a topic on the remote cluster (e.g., primary cluster 102) with the same topic ID as the persisted remote topic ID and whether the remote topic (e.g., primary topic 108) is in a StoppedMirror state with the same stopped log end offsets as the local log end offsets of the local topic (e.g., secondary topic 110). If either of these checks fails, then the mirror topic fails, as either (1) the remote topic has been deleted or recreated, or (2) there was production on the local topic before it went into a PendingMirror state, meaning that the logs have diverged and the local or secondary topic 110 cannot be safely converted to a mirror topic. In either of these cases, the state will transition to a FailedMirror. The user can get out of this state by issuing a failover command on the secondary topic 110 to make it writable again. It is important that these checks are performed before the secondary topic 110 is placed into a PausedMirror state, as when the user eventually executes the resume-mirrors command, it must be certain that the secondary topic 110 is in a safe state to resume mirroring.

Figure 8:
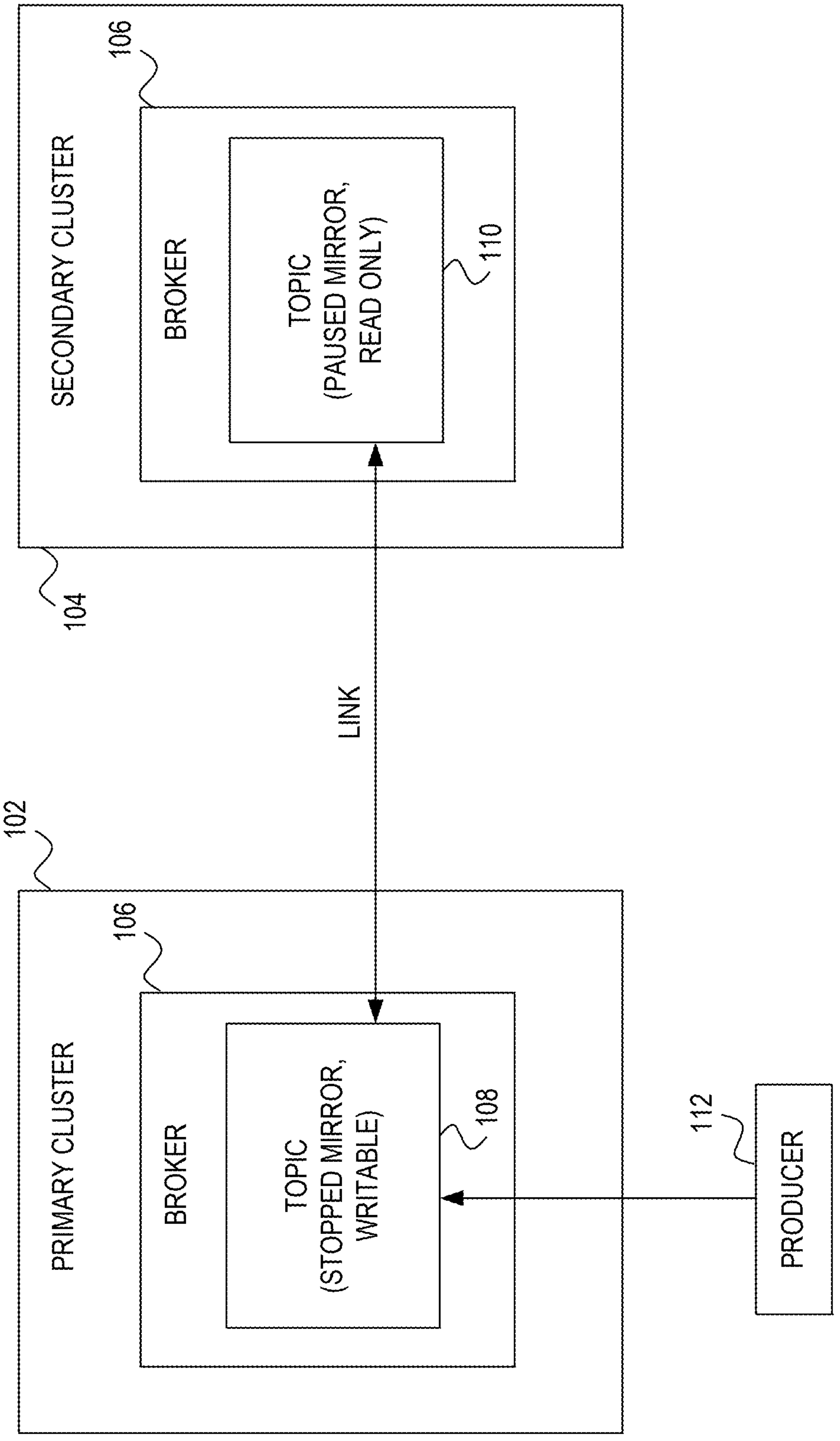
FIG. 8 is a diagram of an alternative stage of the failback process in which the secondary topic is transitioned to a paused mirror state, according to example embodiments.

Once it is verified that the secondary topic 110 can be safely transitioned to a Mirror state in the future, the reverse-and-pause-mirror command is completed. FIG. 8 is a diagram of this alternative stage of the failback process in which the secondary topic 110 is transitioned to a paused mirror state (PausedMirror). When the user is ready to resume mirroring on the secondary topic 110, the user can issue a Resume-Mirror command on the secondary topic 110 to convert the secondary topic 110 into a Mirror state. This triggers an AlterMirror RPC to make the state change to the active mirror topic. Upon the activation of the mirror, the secondary topic 110 is now in an active mirror state as shown in FIG. 7.

Figure 9:
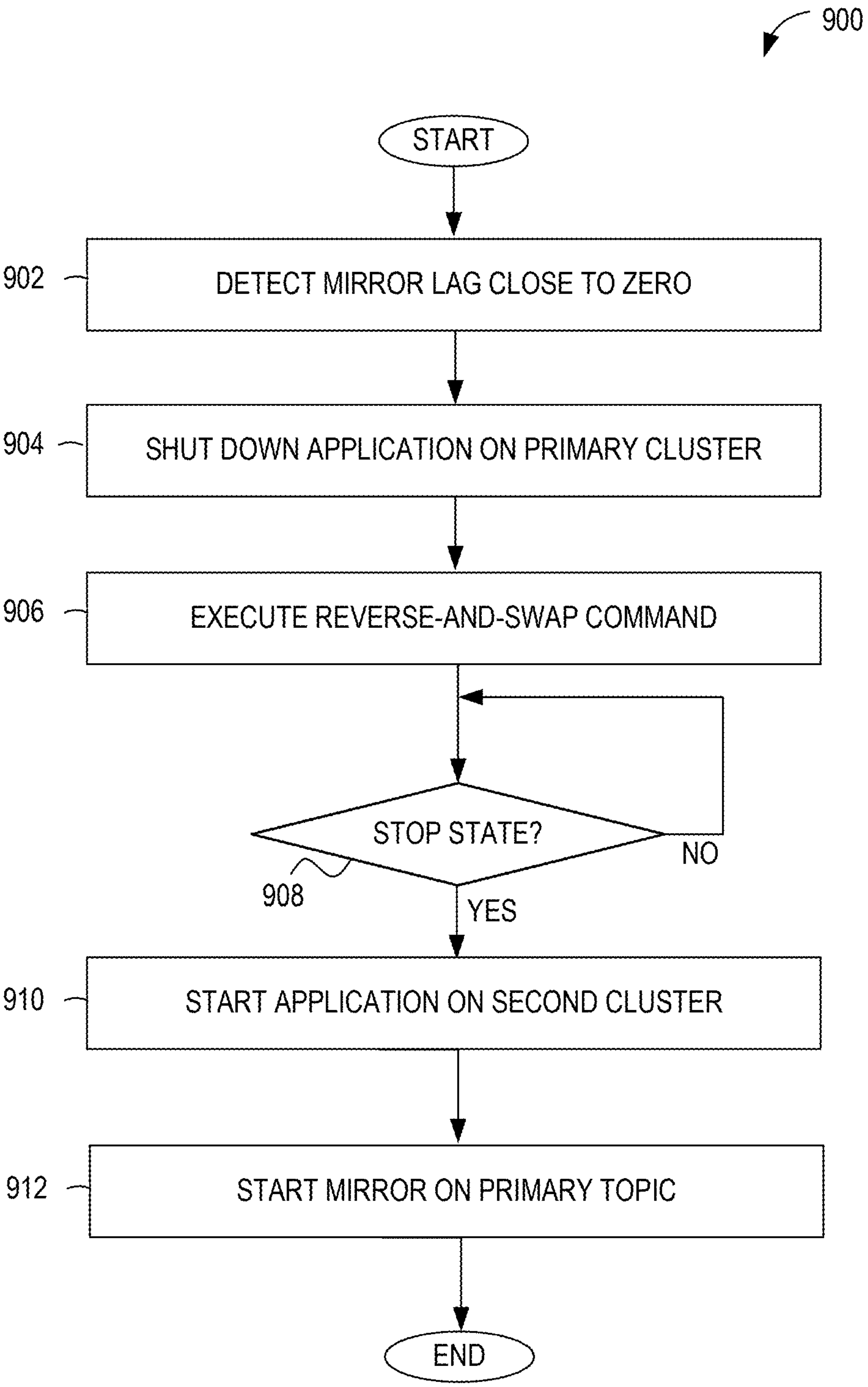
FIG. 9 is a flowchart illustrating operations of a method for performing the planned failover, according to some example embodiments.

FIG. 9 is a flowchart illustrating operations of a method 900 for performing the planned failover, according to some example embodiments. Operations in the method 900 may be performed by the components in the network environment described above with respect to FIG. 1-FIG. 8. Accordingly, the method 900 is described by way of example with reference to components in the network environment. However, it shall be appreciated that at least some of the operations of the method 900 may be deployed on various other hardware configurations or be performed by similar components. Therefore, the method 900 is not intended to be limited to these components.

In operation 902, a component detects that mirror lag is close to zero at a secondary topic 110. The component can provide a notification to a user (e.g., customer) associated with the data being stored to the primary cluster 102 and being mirrored by the secondary cluster 104.

In response to the lag being close to zero, the applications on the primary cluster 102 are shut down in operation 904. In some embodiments, the user issues one or more commands to shut down the applications on the primary cluster 102.

In operation 906, the reverse-and-swap command is executed. In example embodiments, the reverse-and-swap command is only executed when lag is detected to be near zero. Otherwise, the reverse will be unsuccessful if there is not a complete synchronization of all the data. In some embodiments, the reverse-and-swap command is a reverse-and-start-mirror command. In other embodiments, the reverse-and-swap command is a reverse-and-pause-mirror command which delays the mirroring until a resume-mirror command is issued to the primary cluster 102.

During the execution of the reverse-and-swap command a series of operations are performed on the topics being failover. The series of operations include placing the primary topic 108 (e.g., production topic) and corresponding secondary topic 110 (e.g., mirror topic) in a read-only state to allow the mirror topic to synchronize all data. When mirror lag is zero, a promote command is executed that triggers best effort synchronization of consumer offsets (e.g., best effort attempt at mirror topic metadata synchronization). Once the synchronization is completed or a timeout triggered, the secondary (mirror) topic 110 is placed in a StoppedMirror state.

In operation 908, a determination is made whether the secondary (mirror) topic 110 associated with the command is in a stopped state. If the secondary topic 110 is not stopped, then the method 900 waits and performs the determination of operation 908 a predetermined time later.

Once the secondary topic 110 is in the stopped state, then in operation 910, an application is started on the secondary cluster 104. As a result, producers 112 can write to the secondary topic 110 of the secondary cluster 104.

In operation 912, mirroring is started on the corresponding primary topic 108 in the primary cluster 102. In embodiments where the reverse-and-start-mirror command was executed, the mirroring on the primary topic 108 starts immediately in response to a positive verification check. However, in embodiments where the reverse-and-pause-mirror command was executed, a resume-mirror command needs to be issued before mirroring starts on the primary topic 108.

Figure 10:
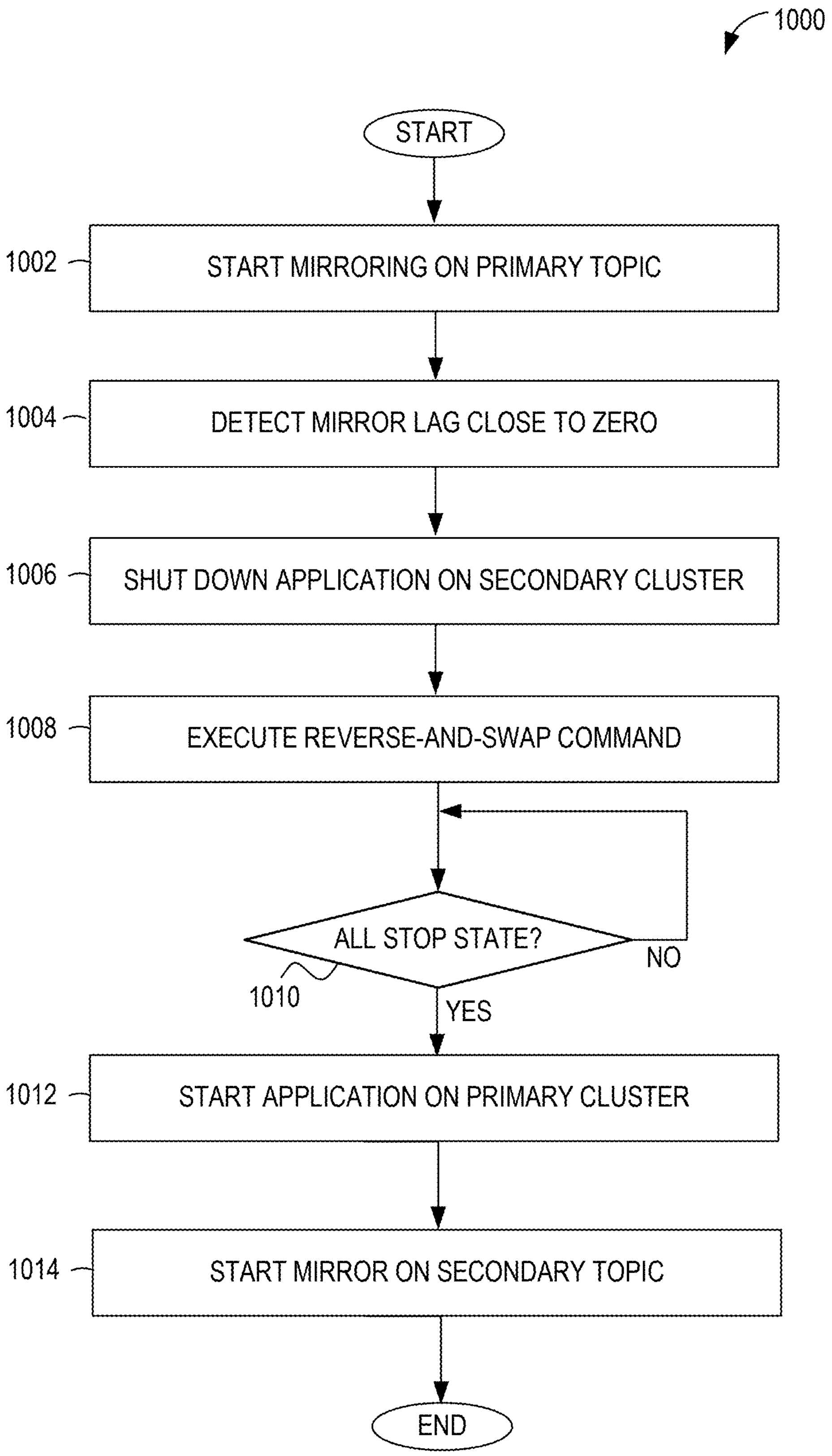
FIG. 10 is a flowchart illustrating operations of a method for performing the failback, according to some example embodiments.

FIG. 10 is a flowchart illustrating operations of a method 1000 for performing the planned failback, according to some example embodiments. Operations in the method 1000 may be performed by the components in the network environment described above with respect to FIG. 1-FIG. 8. Accordingly, the method 1000 is described by way of example with reference to components in the network environment. However, it shall be appreciated that at least some of the operations of the method 1000 may be deployed on various other hardware configurations or be performed by similar components. Therefore, the method 1000 is not intended to be limited to these components.

In operation 1002, mirroring is started on the primary topic 108 in the primary cluster 102 if it has not already been started during the failover. In some embodiments, the primary topic 108 can start mirroring when the resume-mirror command is executed.

In operation 1004, a component detects that mirror lag is close to zero at the primary topic 108. The component can provide a notification to a user (e.g., customer) associated with the data being stored to the primary and secondary clusters 102 and 104.

In response to the lag being near zero, the applications on the secondary cluster 104 are shut down in operation 1006. In some embodiments, the user issues one or more commands to shut down the applications on the secondary cluster 104.

In operation 1008, the reverse-and-swap command is executed on the primary cluster 102. In example embodiments, the reverse-and-swap command is only executed when lag is detected to be near zero. In some embodiments, the reverse-and-swap command is a reverse-and-start-mirror command. In other embodiments, the reverse-and-swap command is a reverse-and-pause-mirror command which delays the mirroring until a resume-mirror command is issued to the secondary cluster 104.

During the execution of the reverse-and-swap command a series of operations are performed on the topics being failback. The series of operations include placing the secondary topic 110 (e.g., production topic) and the corresponding primary topic 108 (e.g., mirror topic) in a read-only state to allow the mirror topics to synchronize all data. When mirror lag is zero, a promote command is executed that triggers best effort synchronization of consumer offsets (e.g., best effort attempt at mirror topic metadata synchronization). Once the synchronization is completed or a timeout triggered, the primary (mirror) topic 108 is placed in a StoppedMirror state.

In operation 1010, a determination is made whether the primary (mirror) topic 108 has moved to the stopped state. When the primary topic 108 is in a stopped state, it ensures that no new data is being written allowing the components to accurately access and confirm that the mirror lag is zero. If the primary topic 108 is not stopped, then the method 1000 waits a predetermined amount of time and performs the determination of operation 1010 again. However, if the primary topic 108 has stopped, then in operation 1012, an application is started on the primary cluster 102 thus activating the primary topic 108 to be in a production state and resume production operations.

In operation 1014, the corresponding secondary topic 110 in the secondary cluster 104 can be transitioned to a mirror state and start mirroring data from the primary topic 108. In embodiments where the reverse-and-start-mirror command was executed, the mirroring on the corresponding secondary topic 110 starts immediately. However, in embodiments where the reverse-and-pause-mirror command was executed, a resume-mirror command needs to be issued before mirroring starts on the corresponding secondary topic 110.

As discussed in FIG. 9 and FIG. 10, the planned failover and the failback processes are similar in order to ensure that data is not lost and offsets are preserved. Essentially, a same reverse command (e.g., reverse-and-swap command) is given only when mirror lag is near zero that causes the production and mirroring clusters to be reversed once the mirror lag becomes zero.

For simplicity of discussion, example embodiments have been discussed with a single topic in each of the primary and secondary clusters 102 and 104. It is noted that any number of topics can exist in the primary and secondary clusters 102 and 104 and that the operations discussed herein can be applied to one or more of the topics in each of the primary and secondary clusters 102 and 104 (e.g., a subset of topics in each cluster). Thus, for example, a subset of the topics can be involved in a planned failover and the failback. When multiple topics are being failover/failback, each topic performs the above discussed operations separately. Thus, if one topic is slow in reaching the StoppedMirror state, other topics that have already reached that state can be transitioned into a writable state separately. Similarly, individual topics can be transitioned to a Mirror state separately and start mirroring independent of other topics in the same cluster.

Figure 11:
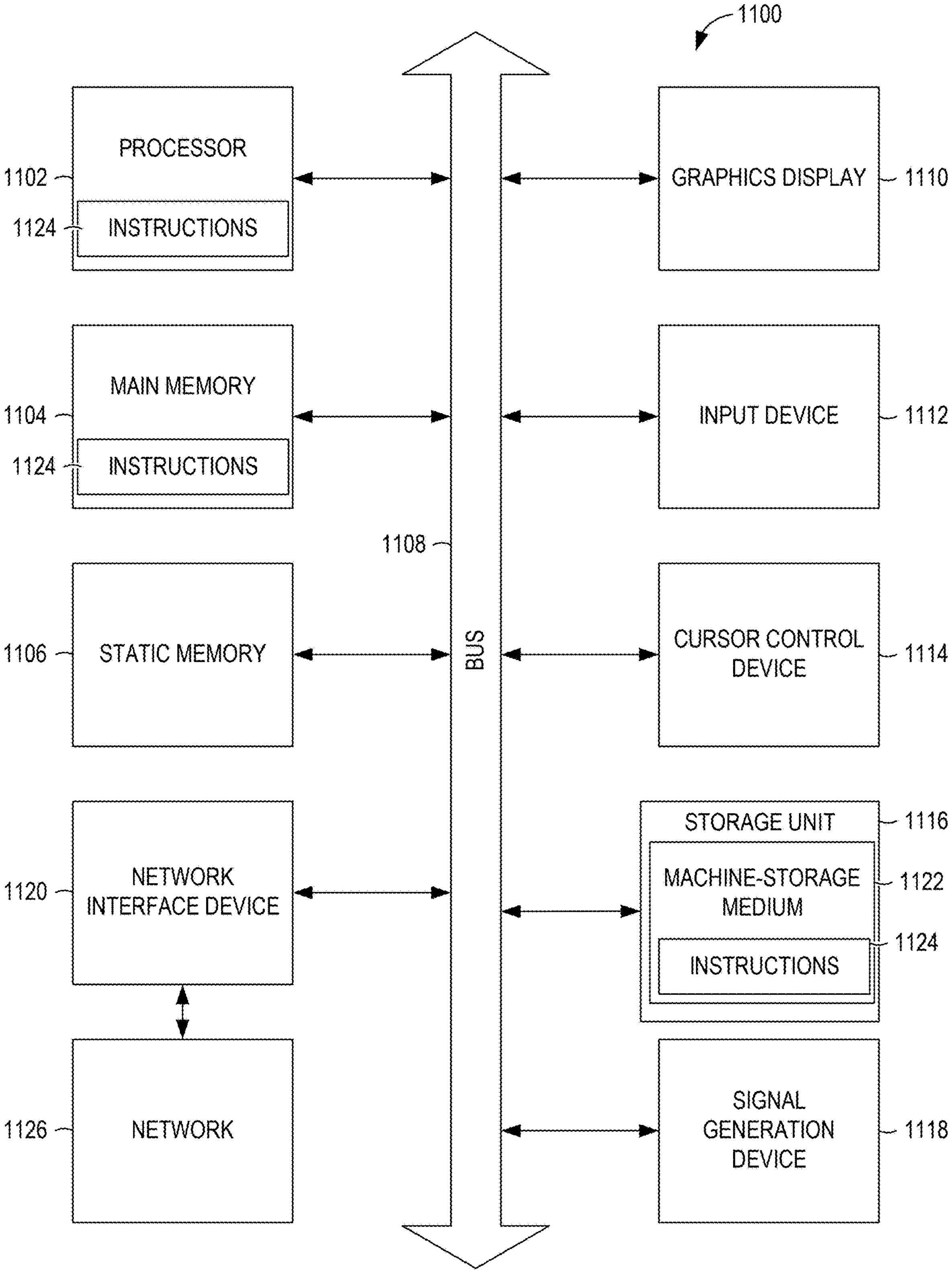
FIG. 11 is a block diagram illustrating components of a machine, according to some example embodiments, able to read instructions from a machine-storage medium and perform any one or more of the methodologies discussed herein.

FIG. 11 illustrates components of a machine 1100, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 11 shows a diagrammatic representation of the machine 1100 in the example form of a computer device (e.g., a computer) and within which instructions 1124 (e.g., software, a program, an application, an applet, an app, or other executable code) for causing the machine 1100 to perform any one or more of the methodologies discussed herein may be executed, in whole or in part.

For example, the instructions 1124 may cause the machine 1100 to execute the flow diagram of FIG. 9 and FIG. 10. In one embodiment, the instructions 1124 can transform the general, non-programmed machine 1100 into a particular machine (e.g., specially configured machine) programmed to carry out the described and illustrated functions in the manner described.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108.

The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT), or any other display capable of displaying graphics or video). The machine 1100 may also include an input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes a machine-storage medium 1122 (e.g., a tangible machine-storage medium) on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered as machine-storage media (e.g., tangible and non-transitory machine-storage media). The instructions 1124 may be transmitted or received over a network 1126 via the network interface device 1120.

In some example embodiments, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1122 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 may further be transmitted or received over a communications network 1126 using a transmission medium via the network interface device 1120 and utilizing any one of a number of well-known transfer protocols (e.g., HTTP). Examples of communication networks 1126 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application

EXAMPLES

Example 1 is a method for seamless failback after a planned failover. The method comprises executing a reverse-and-swap command to transition a primary topic on a primary cluster from a mirror state to a production state and a corresponding secondary topic on a secondary cluster from the production state to the mirror state; based on the reverse-and-swap command, placing the primary topic and the corresponding secondary topic in a read-only state to allow the primary topic to synchronize all data; detecting that the primary topic is in a stopped mirror state after synchronizing all the data; after the primary topic is in the stopped mirror state, transitioning the primary topic to the production state; and after the transitioning of the primary topic, transitioning the corresponding secondary topic to the mirror state, the corresponding secondary topic mirroring data from the primary topic In example 2, the subject matter of example 1 can optionally include wherein the reverse-and-swap command comprises a reverse-and-start-mirror command that immediately transitions the secondary topic to the mirror state after the failback.

In example 3, the subject matter of any of examples 1-2 can optionally include wherein the reverse-and-swap command comprises a reverse-and-pause-mirror command that places the secondary topic in a paused mirror state until a resume-mirror command is executed.

In example 4, the subject matter of any of examples 1-3 can optionally include verifying that mirror lag is near zero before executing the reverse-and-swap command.

In example 5, the subject matter of any of examples 1-4 can optionally include after placing the primary topic and the secondary topic in the read-only state, detecting that mirror lag is zero; and in response to detecting that mirror lag is zero, executing a command to synchronize consumer offsets.

In example 6, the subject matter of any of examples 1-5 can optionally include wherein the command includes a configurable timeout for synchronizing of the consumer offsets.

In example 7, the subject matter of any of examples 1-6 can optionally include transitioning the primary topic to the stopped state in response to completion of the synchronization of the consumer offsets or a timeout.

In example 8, the subject matter of any of examples 1-7 can optionally include performing a verification check to ensure data integrity before transitioning the secondary topic to the mirror state.

In example 9, the subject matter of any of examples 1-8 can optionally include shutting down all producers producing to the secondary topic prior to executing the reverse-and-swap command.

In example 10, the subject matter of any of examples 1-9 can optionally include recording stopped log end offsets in the primary cluster before starting up producers on the primary cluster.

In example 11, the subject matter of any of examples 1-10 can optionally include verifying that log end offsets are aligned between the primary topic and the secondary topic, wherein the transitioning of the secondary topic occurs in response to the verifying.

Example 12 is a system for seamless failback after a planned failover. The system comprises one or more hardware processors and one or more storage components storing instructions that, when executed by the one or more hardware processors, cause the one or more hardware processors to perform operations comprising executing a reverse-and-swap command to transition a primary topic on a primary cluster from a mirror state to a production state and a corresponding secondary topic on a secondary cluster from the production state to the mirror state; based on the reverse-and-swap command, placing the primary topic and the corresponding secondary topic in a read-only state to allow the primary topic to synchronize all data; detecting that the primary topic is in a stopped mirror state after synchronizing all the data; after the primary topic is in the stopped mirror state, transitioning the primary topic to the production state; and after the transitioning of the primary topic, transitioning the corresponding secondary topic to the mirror state, the corresponding secondary topic mirroring data from the primary topic.

In example 13, the subject matter of example 12 can optionally include wherein the reverse-and-swap command comprises a reverse-and-start-mirror command that immediately transitions the secondary topic to the mirror state after the failback.

In example 14, the subject matter of any of examples 12-13 can optionally include wherein the reverse-and-swap command comprises a reverse-and-pause-mirror command that places the secondary topic in a paused mirror state until a resume-mirror command is executed.

In example 15, the subject matter of any of examples 12-14 can optionally include wherein the operations further comprise verifying that mirror lag is near zero before executing the reverse-and-swap command.

In example 16, the subject matter of any of examples 12-15 can optionally include wherein the operations further comprise after placing the primary topic and the secondary topic in the read-only state, detecting that mirror lag is zero; and in response to detecting that mirror lag is zero, executing a command to synchronize consumer offsets.

In example 17, the subject matter of any of examples 12-16 can optionally include wherein the command includes a configurable timeout for synchronizing of the consumer offsets.

In example 18, the subject matter of any of examples 12-17 can optionally include wherein the operations further comprise transitioning the primary topic to the stopped state in response to completion of the synchronization of the consumer offsets or a timeout.

In example 19, the subject matter of any of examples 12-18 can optionally include wherein the operations further comprise performing a verification check to ensure data integrity before transitioning the secondary topic to the mirror state.

Example 20 is a storage medium comprising instructions which, when executed by one or more hardware processors of a machine, cause the machine to perform operations for seamless failback after a planned failover. The operations comprise executing a reverse-and-swap command to transition a primary topic on a primary cluster from a mirror state to a production state and a corresponding secondary topic on a secondary cluster from the production state to the mirror state; based on the reverse-and-swap command, placing the primary topic and the corresponding secondary topic in a read-only state to allow the primary topic to synchronize all data; detecting that the primary topic is in a stopped mirror state after synchronizing all the data; after the primary topic is in the stopped mirror state, transitioning the primary topic to the production state; and after the transitioning of the primary topic, transitioning the corresponding secondary topic to the mirror state, the corresponding secondary topic mirroring data from the primary topic.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for seamless failback after a planned failover, the method comprising:

executing a reverse-and-swap command to transition a primary topic on a primary cluster from a mirror state to a production state and a corresponding secondary topic on a secondary cluster from the production state to the mirror state;

based on the reverse-and-swap command, placing the primary topic and the corresponding secondary topic in a read-only state to allow the primary topic to synchronize all data;

detecting that the primary topic is in a stopped mirror state after synchronizing all the data;

after the primary topic is in the stopped mirror state, transitioning the primary topic to the production state; and after the transitioning of the primary topic, transitioning the corresponding secondary topic to the mirror state, the corresponding secondary topic mirroring data from the primary topic.

2. The method of claim 1, wherein the reverse-and-swap command comprises a reverse-and-start-mirror command that immediately transitions the secondary topic to the mirror state after the failback.

3. The method of claim 1, wherein the reverse-and-swap command comprises a reverse-and-pause-mirror command that places the secondary topic in a paused mirror state until a resume-mirror command is executed.

4. The method of claim 1, further comprising:

verifying that mirror lag is near zero before executing the reverse-and-swap command.

5. The method of claim 1, further comprising:

after placing the primary topic and the secondary topic in the read-only state, detecting that mirror lag is zero; and in response to detecting that mirror lag is zero, executing a command to synchronize consumer offsets.

6. The method of claim 5, wherein the command includes a configurable timeout for synchronizing of the consumer offsets.

7. The method of claim 5, further comprising:

transitioning the primary topic to the stopped state in response to completion of the synchronization of the consumer offsets or a timeout.

8. The method of claim 1, further comprising:

performing a verification check to ensure data integrity before transitioning the secondary topic to the mirror state.

9. The method of claim 1, further comprising:

shutting down all producers producing to the secondary topic prior to executing the reverse-and-swap command.

10. The method of claim 1, further comprising:

recording stopped log end offsets in the primary cluster before starting up producers on the primary cluster.

11. The method of claim 1, further comprising:

verifying that log end offsets are aligned between the primary topic and the secondary topic, wherein the transitioning of the secondary topic occurs in response to the verifying.

12. A system for seamless failback after a planned failover, the system comprising:

one or more hardware processors; and one or more storage components storing instructions that, when executed by the one or more hardware processors, cause the one or more hardware processors to perform operations comprising:

executing a reverse-and-swap command to transition a primary topic on a primary cluster from a mirror state to a production state and a corresponding secondary topic on a secondary cluster from the production state to the mirror state;

based on the reverse-and-swap command, placing the primary topic and the corresponding secondary topic in a read-only state to allow the primary topic to synchronize all data;

detecting that the primary topic is in a stopped mirror state after synchronizing all the data;

after the primary topic is in the stopped mirror state, transitioning the primary topic to the production state; and after the transitioning of the primary topic, transitioning the corresponding secondary topic to the mirror state, the corresponding secondary topic mirroring data from the primary topic.

13. The system of claim 12, wherein the reverse-and-swap command comprises a reverse-and-start-mirror command that immediately transitions the secondary topic to the mirror state after the failback.

14. The system of claim 12, wherein the reverse-and-swap command comprises a reverse-and-pause-mirror command that places the secondary topic in a paused mirror state until a resume-mirror command is executed.

15. The system of claim 12, wherein the operations further comprise:

verifying that mirror lag is near zero before executing the reverse-and-swap command.

16. The system of claim 12, wherein the operations further comprise:

after placing the primary topic and the secondary topic in the read-only state, detecting that mirror lag is zero; and in response to detecting that mirror lag is zero, executing a command to synchronize consumer offsets.

17. The system of claim 16, wherein the command includes a configurable timeout for synchronizing of the consumer offsets.

18. The system of claim 16, wherein the operations further comprise:

transitioning the primary topic to the stopped state in response to completion of the synchronization of the consumer offsets or a timeout.

19. The system of claim 12, wherein the operations further comprise:

performing a verification check to ensure data integrity before transitioning the secondary topic to the mirror state.

20. A machine-storage medium comprising instructions which, when executed by one or more hardware processors of a machine, cause the machine to perform operations for seamless failback after a planned failover, the operations comprising:

executing a reverse-and-swap command to transition a primary topic on a primary cluster from a mirror state to a production state and a corresponding secondary topic on a secondary cluster from the production state to the mirror state;

based on the reverse-and-swap command, placing the primary topic and the corresponding secondary topic in a read-only state to allow the primary topic to synchronize all data;

detecting that the primary topic is in a stopped mirror state after synchronizing all the data;

after the primary topic is in the stopped mirror state, transitioning the primary topic to the production state; and after the transitioning of the primary topic, transitioning the corresponding secondary topic to the mirror state, the corresponding secondary topic mirroring data from the primary topic.

* * * * *